United States Patent
Iruela et al.

(10) Patent No.: US 6,982,958 B2
(45) Date of Patent: Jan. 3, 2006

(54) METHOD FOR TRANSMITTING LOOPBACK CELLS THROUGH A SWITCHING NODE OF AN ASYNCHRONOUS TRANSFER MODE (ATM) NETWORK

(75) Inventors: Jose Iruela, St Laurent du Var (FR); Daniel Orsatti, LaGaude (FR); Bruno Rene Rousseau, Vence (FR); Dominique Rigal, Nice (FR); Jean Claude Zunino, Nice (FR)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 09/753,931

(22) Filed: Jan. 3, 2001

(65) Prior Publication Data

US 2001/0015959 A1    Aug. 23, 2001

(30) Foreign Application Priority Data

Feb. 22, 2000    (EP)    .................................. 00480022

(51) Int. Cl.
*H04L 12/56* (2006.01)

(52) U.S. Cl. .................................... 370/236; 370/395.1
(58) Field of Classification Search ................ 370/235, 370/236, 236.1, 236.2, 241.1, 249, 389, 392, 370/395.1, 397, 399
See application file for complete search history.

(56) References Cited

U.S. PATENT DOCUMENTS

| | | | | |
|---|---|---|---|---|
| 5,659,540 A | * | 8/1997 | Chen et al. | 370/249 |
| 5,710,760 A | * | 1/1998 | Moll | 370/249 |
| 5,757,778 A | * | 5/1998 | Kim et al. | 370/252 |
| 5,818,842 A | * | 10/1998 | Burwell et al. | 370/397 |
| 5,864,555 A | * | 1/1999 | Mathur et al. | 370/236.2 |
| 5,872,770 A | * | 2/1999 | Park et al. | 370/241.1 |
| 6,023,455 A | * | 2/2000 | Takahashi | 370/249 |
| 6,154,448 A | * | 11/2000 | Petersen et al. | 370/248 |
| 6,181,680 B1 | * | 1/2001 | Nagata et al. | 370/248 |
| 6,661,800 B1 | * | 12/2003 | Hayama et al. | 370/403 |
| 6,724,728 B1 | * | 4/2004 | Manchester et al. | 370/236.2 |
| 2001/0002909 A1 | * | 6/2001 | Iwamoto | 370/395 |
| 2001/0019553 A1 | * | 9/2001 | Orsatti | 370/386 |

* cited by examiner

*Primary Examiner*—Chi Pham
*Assistant Examiner*—Anh-Vu Ly
(74) *Attorney, Agent, or Firm*—Joscelyn G. Cockburn

(57) ABSTRACT

A method and system for transmitting a loopback cell within an ATM connection. The method comprises the steps of detecting in an input adapter whether or not an incoming ATM cell includes a loopback condition indicator. If so, specific routing labels are appended to the incoming ATM cell indicating that the incoming cell is a loopback cell to be looped back on the connection such that the switch engine of the switching node transfers the loopback cell to the same port of the input adapter utilizing the appended routing labels.

5 Claims, 5 Drawing Sheets

US 6,982,958 B2

METHOD FOR TRANSMITTING LOOPBACK CELLS THROUGH A SWITCHING NODE OF AN ASYNCHRONOUS TRANSFER MODE (ATM) NETWORK

BACKGROUND OF THE INVENTION

1. Technical Field

The invention relates in general to an Asynchronous Transfer Mode (ATM) network wherein a connection is established between a source ATM device and a destination ATM device by multiple network switching nodes, and in particular to a method for routing loopback cells from the switch engine of one of the switching nodes located on the route used by this connection.

2. Description of the Related Art

The use of ATM switching nodes in an Internet Protocol (IP) network is an attractive solution since ATM hardware switches have been extensively studied and are widely available in many different architectures. When an ATM network connection is established from a source ATM device to a destination ATM device through multiple switching nodes, the incoming cells to a switching node are automatically routed to the next switching node of the connection. To achieve such automatic routing, each cell includes an ATM header along with its payload. An ATM protocol engine within the switching node identifies an incoming ATM cell using a lookup table. In the case of a valid cell ("valid" meaning belonging to an existing connection), the protocol engine performs traffic management functions (traffic policing, congestion management, priority management, etc.) and queues the cell in an appropriate queue. A scheduler using priority-based scheduling procedures selects queues from which cells are to be transmitted. The cells within the selected queues are then dequeued.

Prior to transmitting the dequeued cells, the protocol engine adds routing labels to the each cell including the switch routing label (SRL) and the protocol engine correlator (PEC). The resulting internal cell format used within the switching node will be referred to hereinafter as a "labeled cell."

The SRL contains either an explicit identification of the destination blade or else a pointer to a translation table located in the switching device that includes the explicit destination blade identity. The PEC is a pointer used by the protocol engine of the output adapter to identify the connection. The protocol engine in the output destination adapter receives the cell from the switching device. Similarly to the input protocol engine, the output protocol engine identifies the incoming cell by performing a lookup function on the appended protocol engine correlator, performs traffic management functions, queues the cell in the appropriate queues, dequeues the cell under control of a scheduler, removes the appended labels, swaps the ATM label, and transmits the cell on the connection destination ATM port(s).

ATM standards have defined Operation And Maintenance (OAM) procedures. These procedures are based on particular cells that are identifiable as OAM cells in accordance with specified values encoded in the payload type indicator (PTI) field of the ATM cell header. Some OAM cells are called "loopback cells." Loopback cells can be either segment loopback cells or end-to-end loopback cells and may optionally include in their payload a source and a destination address indication. The ITU-T I610 specifications define the procedures to be performed by network equipment when receiving OAM loopback cells. In particular ITU-T I610 specifications define the input adapter and the output adapter as the two loopback locations for a switching node. These specifications further describe the loopback condition algorithm using the cells parameters (source address, destination address, segment or end-to-end). By allowing cells to loopback on a connection path at various locations (input or output adapter of the various switching nodes on the connection path), these procedures ATM connection monitoring or problem determination and failure isolation within the ATM connection.

When OAM cells such as loopback cells are received by a switching node, the node typically processes the OAM cells by transmitting said cells to a dedicated processing resource such as a local processor that would perform requisite OAM procedures. However, the procedure is costly inasmuch as it requires incorporating microprocessors on the adapter card of the switching node whereas the non-OAM connection cells use ASIC modules which are data processing units specifically designed for the routing of the ATM cells.

SUMMARY OF THE INVENTION

A method and system for transmitting a loopback cell within an ATM connection are disclosed herein. The method comprises the steps of detecting in an input adapter whether or not an incoming ATM cell includes a loopback condition indicator. If so, specific routing labels are appended to the incoming ATM cell indicating that the incoming cell is a loopback cell to be looped back on the connection such that the switch engine of the switching node transfers the loopback cell to the same port of the input adapter utilizing the appended routing labels.

All objects, features, and advantages of the present invention will become apparent in the following detailed written description.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE PREFERRED EMBODIMENT

Figure 1:
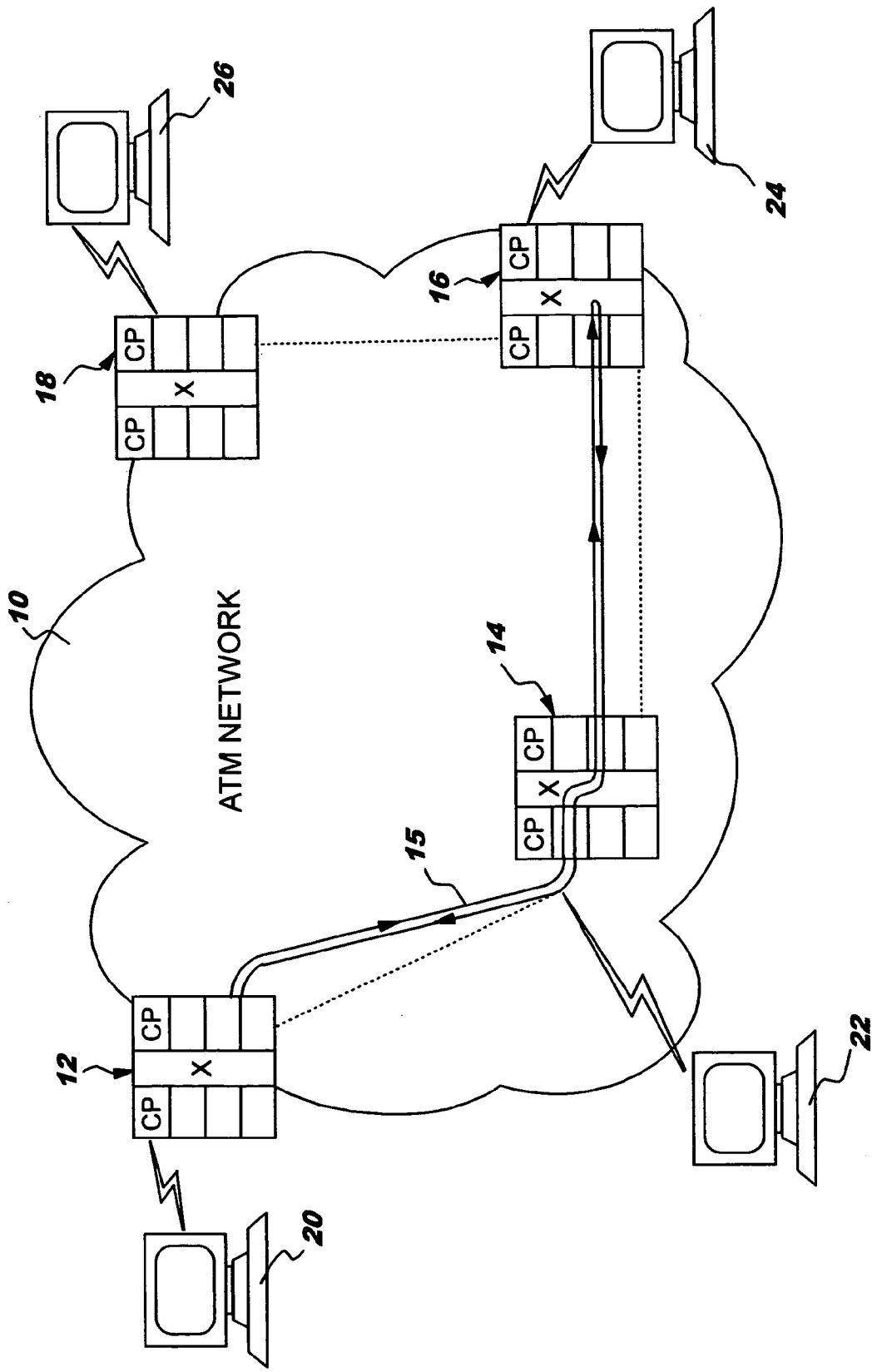
FIG. 1 is a block diagram of an ATM network in which a loopback cell is routed in accordance with a preferred embodiment of the present invention.

With reference now to the figures wherein like reference numerals refer to like and corresponding parts throughout and in particular with reference to FIG. 1, there is illustrated a block diagram of an ATM network 10 in which a loopback cell is routed in accordance with a preferred embodiment of the present invention. As shown in FIG. 1, ATM network 10 comprises four switching nodes 12, 14, 16 and 18, each respectively connected to local consoles 20, 22, 24 and 26. Each switching node is composed of a Control Point (CP) blade and a plurality of adapter blades, which provide the physical attachments to network devices such as the other switching nodes or the user workstations and a switch engine (X) providing cell switching between its ports on which are attached the adapter blades. The local console attached to the CP blade in each node is used for network and control management. It should be noted that each blade includes an input and an output adapter.

It is assumed that a connection represented as dotted lines in FIG. 1 is established between the source switching node 12 and the destination switching node 18 through the intermediary switching nodes 14 and 16. For this connection, an ATM cell enters each switching node via an input adapter and exits the switching node via an output adapter after being switched by the switch engine of the node. In accordance with the principles of the present invention, a loopback cell travels through a loopback cell route 15. The loopback cell is received by an input adapter of switching node 16 and is switched by the switch engine within switching node 16 in order to be transmitted back to switching nodes 14 and 12 over the same connection by the same adapter.

Figure 2:
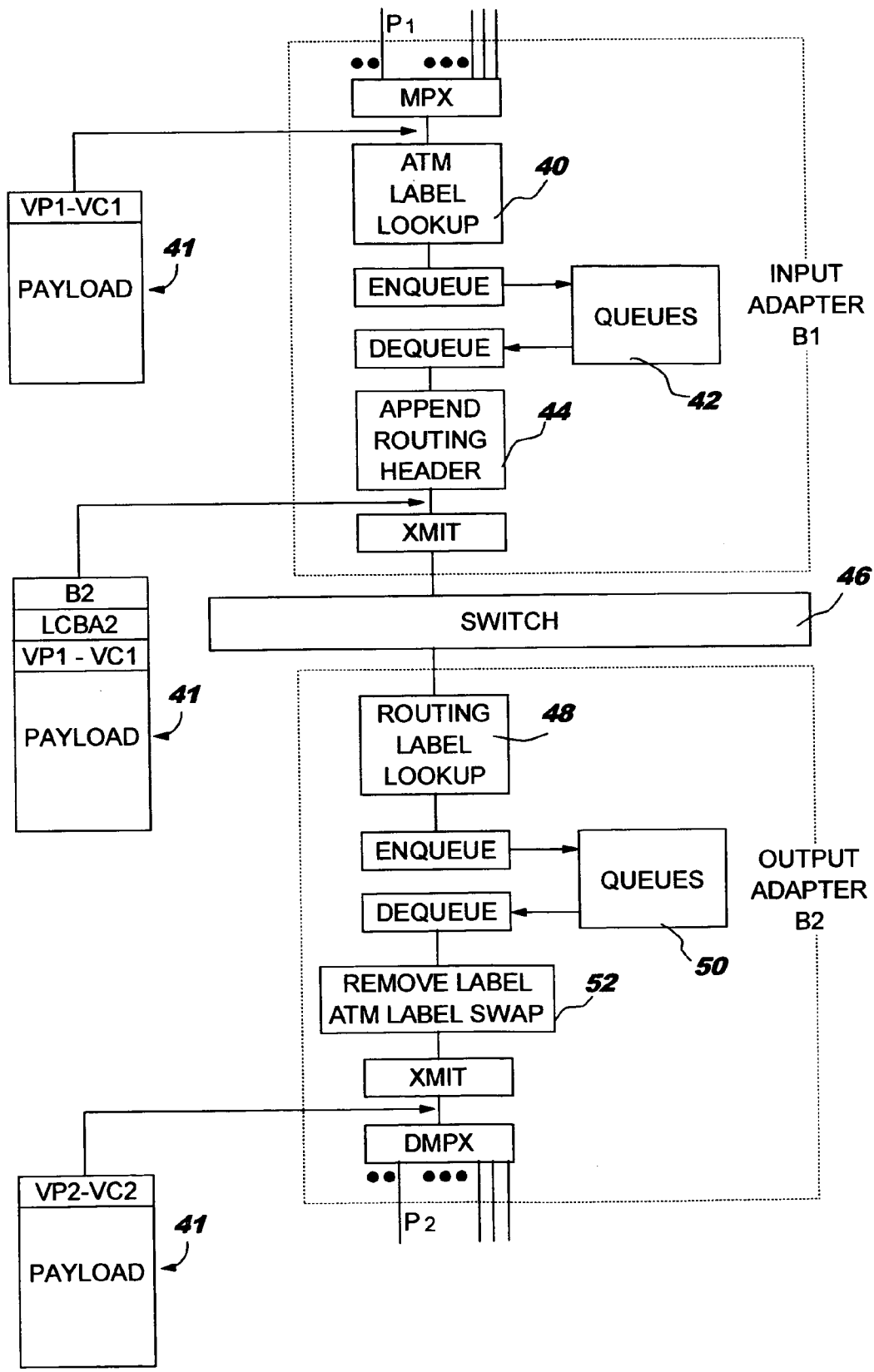
FIGS. 2 and 3 are block diagrams depicting two half-duplex flows within an ATM connection cell between ports of a switching node through which an ATM connection is established.
Figure 3:
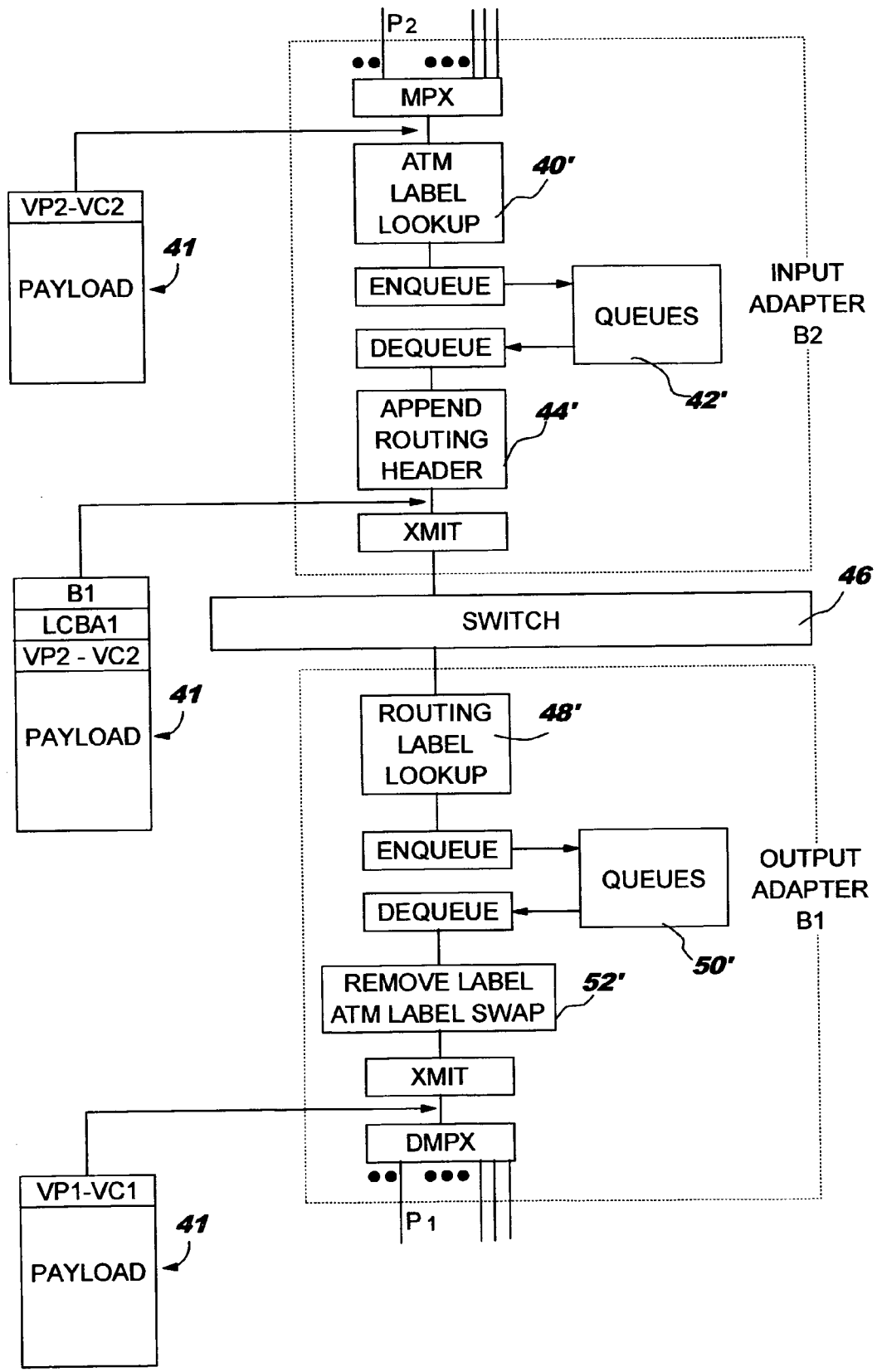

With reference now to FIGS. 2 and 3, there are depicted block diagrams showing two half-duplex flows within an ATM connection cell between ports of a switching node through which an ATM connection is established. The transfer of non-OAM ATM cells through a switching node proceeds as follows. The ATM cells of a given connection are received by a port P1 of an input adapter B1. These cells comprise an ATM label VP1-VC1 (virtual path-virtual circuit) and a payload. First, the protocol engine of adapter B1 identifies an incoming cell 41 using an ATM label lookup table 40. The lookup function performed by label lookup table 40 is an address resolution performed with respect to the source port P1 and the ATM label VP1-VC1.

The lookup within lookup function 40 results in a pointer that points to a connection control block LCBA1 (leaf control block address). Connection control block LCBA1 contains the information necessary to process the incoming cell, including information used to perform the traffic management function and information used to forward the cell. Included among such information is a switch routing label (SRL) indicating the identity of the destination blade B2, and a protocol engine correlator (PEC) which is the pointer in the output adapter used to perform the label swap (LCBA2). Then, the protocol engine enqueues the cell in an appropriate queue 42. A scheduler using priority-based scheduling procedures selects the queue from which ATM cells are to be transmitted and dequeues those cells from the selected queue. Then, the append routing header function 44 appends the routing label B2 and the protocol engine correlator LCBA2 to cell 41 which is transmitted to switch engine 46.

Using the appended SRL B2, switch engine 46 transmits cell 41 to the output adapter B2. Similarly to the protocol engine of the input adapter, the protocol engine of the output adapter identifies the cell in a routing label lookup function 48, performs traffic management functions, queues the cell in the appropriate queue 50, and dequeues cell 41 under the control of a scheduler. Then, the routing labels B2 and protocol engine correlator LCBA2 are removed by remove label function 52, and the ATM label is swapped to the new label pointed by LCBA2 in the connection control block, that is VP2-VC2. At last, the protocol engine transmits the cell on destination port P2 also pointed by LCBA2 in the connection control block.

Reciprocally, when a cell is received by port P2 of input adapter B2, its ATM header is VP2-VC2 as illustrated in FIG. 3. The routing pointer resulting from the label lookup is the pointer LCBA2 pointing to the target adapter identification P1 and the pointer to the connection control block LCBA1 in output adapter B1. These two labels are appended to cell 41 before transmitting it to switch engine 46. Then, in output adapter B1, the routing labels are removed and the ATM header is swapped to VP1-VC1 given by pointer LCBA2 in the connection control block of output adapter B1.

It is clear from the above description that the connection control block pointers LCBA1–LCBA2 for the P1 to P2 half-duplex connection, are the same as connection control block pointers for the P2 to P1 half-duplex connection. Since the connection is full duplex, symmetrical operations are performed on the cell flow received by port P2 of adapter B2 and the cell flow received by port P1 of adapter B1. As described in further detail below, such symmetric operations are utilized in a preferred embodiment of the present invention.

Figure 4:
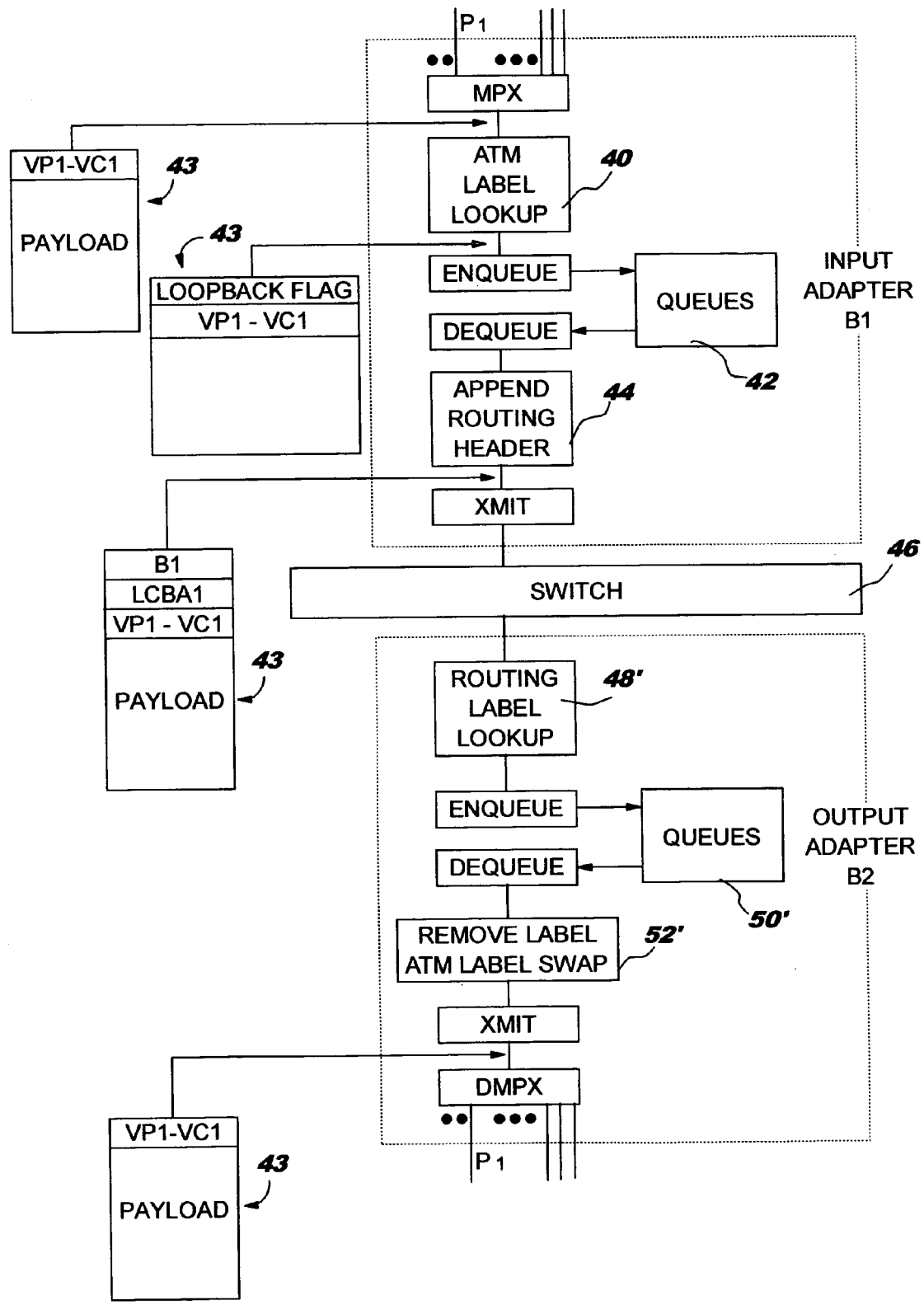
FIG. 4 is a block diagram illustrating the flow of a loopback cell from a port of an adapter to the same port of the same adapter of a switching node in accordance with a preferred embodiment of the present invention.

With reference now to FIG. 4, there is depicted a block diagram illustrating the flow of a loopback cell 43 from a port P1 of adapter B1 to the same port of the same adapter within a full duplex switching node in accordance with a preferred embodiment of the present invention. It is assumed now that incoming cell 43 is an OAM loopback cell received in input adapter B1 from port P1. The cell content is analyzed in accordance with standard OAM procedures. It is assumed hereinafter that connection conditions require that cell 43 loopback from input adapter B1. Such a condition is detected as soon as cell 43 is received by reading a loop condition bit that is set in a specific register or in the cell buffer control block. It should be noted that a loopback may not be allowed within a given switching node. Therefore, a loop control bit must be set by the control point of the switching node in the connection control block for the loopback to proceed. If the loop control bit is set, a loopback flag is added to the cell after which a label lookup is performed within label lookup table 40.

When the cell includes a loopback flag indicating that both loop condition bit and loop control bit are set to 1, the switch routing label and the protocol engine correlator pointed by LCBA1 resulting from the lookup function performed within lookup table 40 and appended to cell 43 by the append routing header function 44 are B1 and LCBA1 rather than B2 and LCBA2. Such a substitution can be easily performed by the extant processing resources within the switching node.

Then, using the appended SRL B1, switch engine 46 transmits cell 43 to output adapter B1. At this stage, cell 43 is equivalent to a cell that would have been received by the switching node on the reverse connection path (from input adapter B2 in FIG. 3). As shown in FIGS. 3 and 4, cell 43 is received by output adapter B1 with the same appended connection identifier PEC LCBA1. The protocol engine in output adapter B1 performs its regular processing. Output adapter B1 identifies cell 43 using LCBA1, runs traffic management functions, queues the cell in the appropriate queue, dequeues the cell under the control of a scheduler, removes from the cell the routing labels (SRL and PEC) and performs the ATM label swap. It should be noted that the label swap for a regular (non-loopback) ATM cell flowing on the connection reverse path swaps VP2-VC2 into VP1-VC1, while for a loopbacked cell, it swaps VP1-VC1 into VP1-VC1. Although this has no effect on the label value, the function is still performed thus allowing the output adapter to maintain its regular function and minimizing the loopback overhead processing in the protocol engine. The loopback cell is transmitted back over the network by port P1 of output adapter B1.

Figure 5:
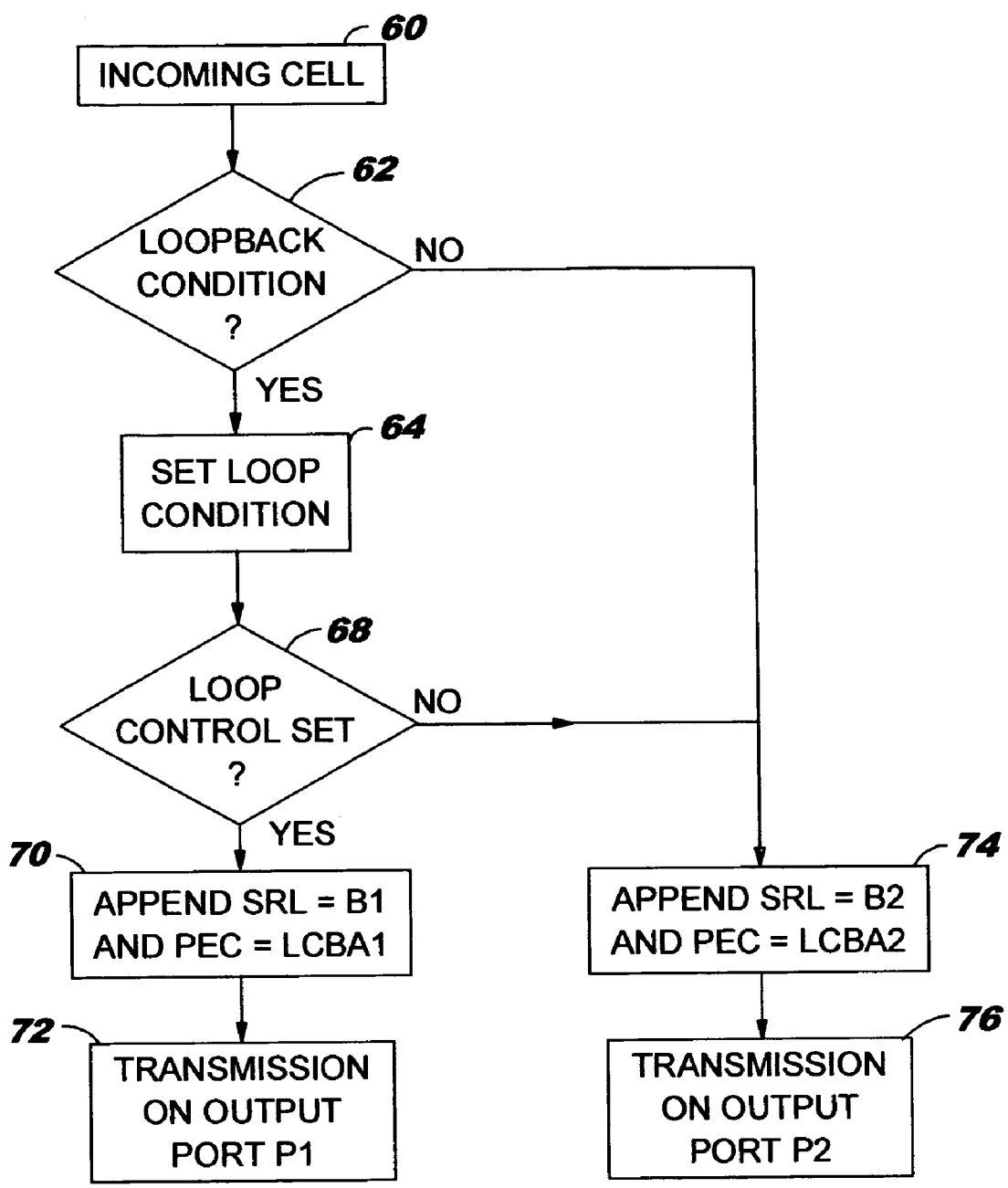
FIG. 5 is a flow diagram depicting steps performed to achieve cell loopback in accordance with a preferred embodiment of the present invention.

Referring to FIG. 5, there is illustrated a flow diagram depicting steps performed to achieve cell loopback in accordance with a preferred embodiment of the present invention. After an incoming cell is received on port P1 of adapter B1 (step 60), a check is performed (step 62) to determine whether loopback conditions are met. If so, a loop condition bit is set in a register or in the cell buffer control block (step 64). Then, the label lookup function is performed resulting in the inclusion of the routing label (SRL B2 and PEC LCBA2) and the loop control bit to connection control blockpointer LCBA1. This function enables a determination of whether or not the loop control bit is set (step 68). If the loop control bit is set, the appended switch routing label is set to B1 and the appended protocol engine correlator is set to LCBA1 (step 70). The loopback cell is then switched by the switch engine to the output adapter B1 in order to be transmitted on the same port P1 from which it had been received (step 72).

If the incoming cell is identified as being a loopback cell as per step 62, or when the loop control bit is not set at step 68, the regular routing labels, SRL B2 and PEC LCBA2, are appended to the cell (step 74) before the cell is switched by the switch engine to output adapter B2 and then transmitted over the network on port P2 of adapter B2 (step 76).

While the invention has been particularly shown and described with reference to a preferred embodiment, it will be understood by those skilled in the art that various changes in form and detail may be made therein without departing from the spirit and scope of the invention.

What is claimed is:

1. A system for transmitting a loopback cell within a switching node of an ATM connection, said switching node including a first adapter having associated ports and a second adapter having associated ports, wherein said loopback cell enters said switching node by a first adapter port, said system comprising:
   processing means within said switching node for detecting a loopback condition when an ATM cell enters said first adapter;
   a routing header function for appending a routing label to said ATM cell indicating that said ATM cell is a loopback cell to be looped back on said ATM connection, said routing label being appended to said loopback cell only if a loop control bit is set by a control point of said switching node within said first adapter, and
   a switching engine for transferring said loopback cell to said first adapter port utilizing said appended routing label.

2. The system of claim 1, further comprising processing means for setting said loop control bit within said first adapter.

3. The system of claim 1, further comprising processing means for adding a loopback flag to said loopback cell if said loop control bit is set, wherein said loopback flag serves as an indicator for a protocol engine within said first adapter that said routing labels have to be appended to said loopback cell.

4. A system for transmitting a loopback cell within a switching node of an ATM connection, said switching node including a first adapter having associated ports and a second adapter having associated ports, wherein said loopback cell enters said switching node by a first adapter port, said system comprising:
   processing means within said switching node for detecting a loopback condition when an ATM cell enters said first adapter;
   a routing header function for appending a routing label to said ATM cell indicating that said ATM cell is a loopback cell to be looped back on said ATM connection, said routing label including a switch routing label for identifying said first adapter as the output adapter from which said loopback cell will exit said switching node, and
   a switching engine for transferring said loopback cell to said first adapter port utilizing said appended routing label.

5. A system for transmitting a loopback cell within a switching node of an ATM connection, said switching node including a first adapter having associated ports and a second adapter having associated ports, wherein said loopback cell enters said switching node by a first adapter port, said system comprising:
   processing means within said switching node for detecting a loopback condition when an ATM cell enters said first adapter;
   a routing header function for appending a routing label to said ATM cell indicating that said ATM cell is a loopback cell to be looped back on said ATM connection; and
   a switching engine for transferring said loopback cell to said first adapter port utilizing said appended routing label and wherein
   the ATM header virtual path/virtual circuit of said loopback cell is not swapped by the protocol engine of said first adapter before said loopback cell is transmitted over an ATM network by said first adapter port.

* * * * *